United States Patent [19]
Altman et al.

[11] 4,125,315
[45] Nov. 14, 1978

[54] LIGHT MIXING DEVICE

[75] Inventors: Richard M. Altman, Woodland Hills; Ravindra K. Badkar, Los Angeles, both of Calif.

[73] Assignee: Vivitar Corporation, Santa Monica, Calif.

[21] Appl. No.: 709,459

[22] Filed: Jul. 28, 1976

[51] Int. Cl.² .......................... G02B 5/14; G03B 27/00
[52] U.S. Cl. ............................. 350/96.10; 350/96.15; 355/1; 355/32; 355/71
[58] Field of Search ............... 350/96 R, 96 B, 96 BC, 350/96.10, 96.16, 96.15; 355/1, 32, 35–38, 71

[56] References Cited

U.S. PATENT DOCUMENTS

| 3,217,594 | 11/1965 | Simmon | 355/1 |
| 3,514,200 | 5/1970 | Bowker | 350/96 R |
| 3,887,279 | 6/1975 | Rubin | 355/38 |
| 3,901,582 | 8/1975 | Milton | 350/96 C |

Primary Examiner—John K. Corbin
Assistant Examiner—Stewart Levy
Attorney, Agent, or Firm—DeLio and Montgomery

[57] ABSTRACT

A light mixing device of optically clear light transmitting material where the various color components of light introduced in the input end of the device are efficiently mixed by internal reflection through the length of the mixer. The mixer may be either linear or curved and includes axially extending reflective surfaces internal of its outer periphery.

21 Claims, 23 Drawing Figures

LIGHT MIXING DEVICE

This invention relates to light mixing systems and more particularly relates to a light mixer useful for photographic purposes to uniformly mix light of differing color.

Uniform distribution of adequately bright light is necessary in order to make sharp professional appearing enlargements with relatively short exposure times, generally less than fifteen seconds. In enlargers intended for use with black and white photograph reproductions, diffusing white light lamps are utilized to provide uniformly distributed light. Such enlargers are also used for color enlargements when the light source is corrected for color by introducing color compensating filters into the light path.

Modern color enlarger systems generally comprise a tungsten halogen lamp with integral heat transmitting reflector, dichroic filters movable into the light path for color corrections, a hollow reflective chamber to mix the light and diffusers to provide uniform intensity and color.

In such enlargers, only approximately 10% of the lamp wattage is available as light. Approximately 70% is dissipated as heat and 20% as other losses. The combined efficiency of the light mixing box and diffusers used in the color head is less than 1%. Accordingly, a very small portion of available light produced by the lamp is incident upon the printing paper.

In order to reproduce photographs with a reasonably short exposure time, modern enlargers usually use lamps of higher wattage rating. Generally, when the enlarger color head uses a lamp greater than eighty watts, a forced air cooling system is required to dissipate the heat. Besides the added expense of such cooling and ventilating system, the use of such systems increase the size of the enlarger head, and internal cooling fans produce the risk of unsharp images due to vibration.

Any frosting or color on the envelope of the lamp used to provide uniform distribution of light in regular black and white enlargers adversely affects light transmission.

Accordingly, a need exists for an efficient light mixing and diffusing device for both black and white, and color enlargers. Such a light mixing device should provide even distribution of light of adequate intensity for printing both black and white, and color enlargements, permit exposures of reasonably short duration with a relatively low wattage lamp and not require a forced air cooling system.

The present invention provides a light mixing system which meets these requirements and provides even distribution of light at very high efficiency.

Briefly stated, the invention comprises the use of optically clear elongated tubular light transmitting elements disposed between a lamp and a condenser-lens assembly. The light incident on the mixer is transmitted and mixed by total internal reflection in the tubular elements. The light striking the walls of the mixer do so at an angle greater than the critical angle, and the lighting rays are reflected back into the mixer, and travel to the exit end of the pipe along a zig-zag path of successive reflection. During this time the different components of the light are well mixed. Internal reflective surfaces are defined in the mixer to maximize reflection and mixing.

An object of this invention is to provide a new and improved light mixing device.

Another object of this invention is to provide a light mixing device of greater efficiency which will provide a uniform distribution of light at the output, and of colors which may be introduced at the input of the mixer.

A further object of this invention is to provide a light mixing device or system of the type described which is comprised of a plurality of easily assembled optically clear solid plastic elements.

A still further object of this invention is to provide a light mixing system which is compact and efficiently mixes light through a plurality of internal reflections as the light travels the length thereof between the input and output ends.

The features of the invention which are believed to be novel are particularly pointed out and distinctly claimed in the concluding portion of this specification. However, the invention both as to its organization and operation together with further objects and advantages thereof may best be appreciated by reference to the following detailed description taken in conjunction with the drawings in which:

FIG. 1 is a diagram somewhat schematic of a photographic enlarger in side elevation which embodies the invention;

FIG. 2 is a view seen in the plane of lines 2—2 of FIG. 1;

FIG. 3 is a cross-sectional view seen in the plane of lines 3—3 of FIG. 1;

FIG. 4 is a view in cross section seen in the plane of lines 4—4 of FIG. 1;

FIG. 5 is a side elevation of an optional element which may be utilized in the system of FIG. 1;

A photographic enlarger 10 in which the invention may be embodied comprises a housing for a lamp 11, with a reflecting surface 12 adapted to focus the light downwardly toward a light mixing system 13. If the enlarger 10 is of the type for making color reproductions, a plurality of dichroic filters 14, 15 and 16 may be mounted between the mixing system 13 and the lamp 11. The filters may be adjustable, as, for example, pivoting about axis 17 into and out of the path of the entering light. In practice, calibrated adjustments are provided so as to dial in a given number of corrective light units of selected color. Disposed below the light mixer 13, which is within a housing 18, is the conventional condensor 19 and an enlarging lens 20. A usual diaphragm or bellows 21 extends between a film carrier slot S, and lens 20. The mixing device as shown in FIG. 1 comprises three tubular lengths 22, 23 and 24. The lengths are comprised of optically clear plastic such as acrylic, or they may be glass.

Section 22 may comprise two half-round sections 25 and 26 which define essentially planar internal reflecting surfaces 25a and 26a. Surfaces 25a and 26a are not in full surface contact.

The upper surfaces 25b and 26b of sections 25 and 26 are medium ground to produce diffusion, and enhance mixing of light. The lower surfaces 25c and 26c may be polished. Selection 23 comprises half-round sections 27 and 28 which have planar internal reflecting surfaces 27a and 28a disposed substantially 90° to surfaces 25a and 26a. Surfaces 27a and 28a also are not in full surface contact as hereinafter explained.

The surfaces 27a and 28a of section 23 are polished, or cast in a polished mold. The lower surfaces of elements 27 and 28 are medium ground as are the upper and lower surfaces of section 24. The entering light is somewhat diffused by the surfaces 25b and 26b. The light entering section 22 after reflection from the internal surfaces 25a and 26a and the exterior glass-to-air or plastic-to-air peripheral interface enters length 23. Half of the light from each of sections 25 and 26 enters each of sections 27 and 28. The light rays from sections 25 and 26 are thus further mixed in sections 27 and 28, as they are reflected from the internal and external surfaces.

The light leaving sections 27 and 28 of length 23 are further mixed by reflection from the interface of the peripheral wall of the solid length 24, and exit surface 29 of length 24 to condenser 19. The ground surfaces previously defined provide diffusion of the light which enhances further reflection. If desired, additional end surfaces of the lengths 22, 23 may be ground for diffusion purposes.

The transparent lengths 22, 23 and 24 may be made of any suitable transparent dielectric which will provide total internal reflection. In the configuration shown the index of refraction of the material should be greater than that of air so that the angles of incidence of the light rays in the mixer exceed the critical angle and are internally reflected.

The adjacent internal surfaces are not in full surface contact so that there will be no light transmitted between the elements and greater reflection will be achieved. Sections 25, 26 and 27, 28 may be separated by air or joined by a cement of such refractory index that the critical angle is exceeded and light will not be transmitted from one element to the other. In practice, the adjacent surfaces, if not spaced apart, will be in contact only at spaced points due to the almost impossibility of two adjoining surfaces being perfectly flat. The surfaces may be spaced apart several microns or more, a distance of several wave lengths. Therefore, very little, if any, light passes between the facing internal surfaces.

The sections comprising the lengths 22 and 23 need not be half round as shown so long as internal reflecting surfaces are provided, and the ends of the elements need not be planar. For example, the ends of one length could be defined conically while the adjacent element is provided with a mating conical internal taper and such surfaces may or may not be diffusion surfaces.

An alternate section 30 is shown in FIG. 5 which may be substituted for any of the sections of FIG. 1. Section 30 comprises a length of transparent tubing which is bifurcated as shown at 31 at each end and a highly reflective material such as an aluminum foil inserted therein, or the cut otherwise filled with a reflective coating.

The mixer may be defined only in three pieces using one member of the overall length of a mixer 13. A tubular rod is molded with one of sections 25 or 26 absent and one of sections 27 or 28 absent. The internal surfaces are then polished to enhance reflection if not cast in a polished mold. Then the omitted sections are assembled after polishing of the internal surfaces and grinding the end surfaces for diffusion purposes. The grinding of the end surfaces to produce a diffusing surface is not absolutely necessary, but such diffusion surfaces contribute to shortening the overall length of the mixer. As used herein the term "internal reflecting surfaces" refers to the non-peripheral surfaces. The peripheral surfaces also produce internal reflection with essentially no refraction of light therethrough.

To achieve the most optimum mixing of different color components, it is preferred that the dimension of each length be at least two times the diameter. This provides sufficient axial dimension for the majority of light rays to be reflected several times along the length of the mixer, with resulting uniform color distribution at the exit end.

The ends of the elements 22, 23, and 24 may be slightly separated and the elements may be mechanically joined or assembled in any manner which do not produce substantial losses due to absorption of light as heat energy. Preferred techniques of assembly are hereinafter described.

The arrangement shown in FIG. 1 in comparative testing was found to emit ten times brighter light than one conventional enlarger where both used eighty watt lamps, and required only a two second exposure time as compared to a fifteen second exposure time for the same prior art enlarger. It will be appreciated that the greater the length of the overall mixing device the better uniformity that can be achieved at the exit end. However, there are practical limitations on the height of an enlarger that will be acceptable to the users.

FIGS. 6–10 disclose another light mixing device embodying the invention which, while having a greater lateral dimension, and a longer light transmission path, has a substantially reduced vertical dimension.

The device 35 comprises an upper housing member 36 having a lamp with reflector 37 disposed therein to focus the light 38 to the entrance end 39 of the mixing device generally indicated by the reference numeral 40. In FIGS. 6–10 the filters are not shown although it will be apparent that they may be provided.

Figure 6:
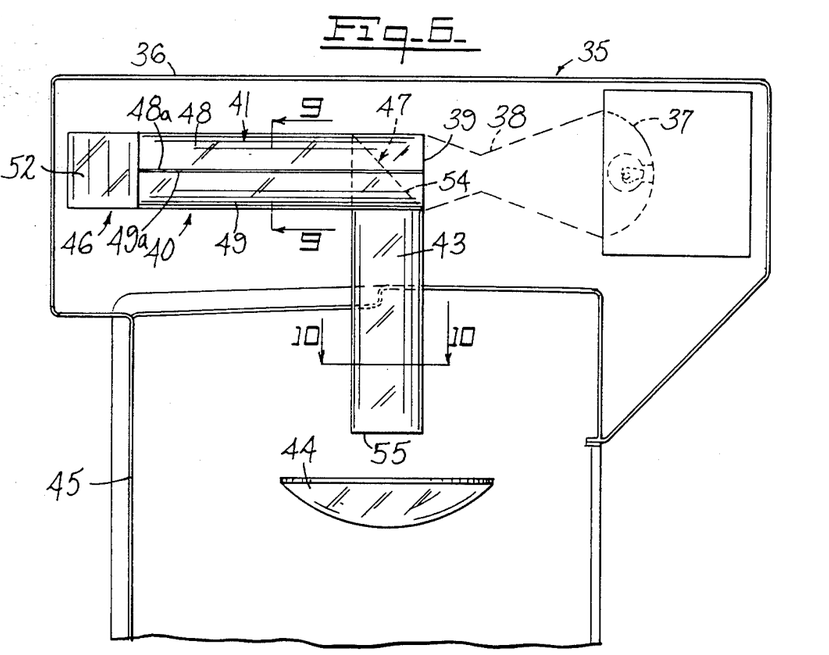
FIG. 6 is an elevation of another mixing system embodying the invention.
Figure 7:
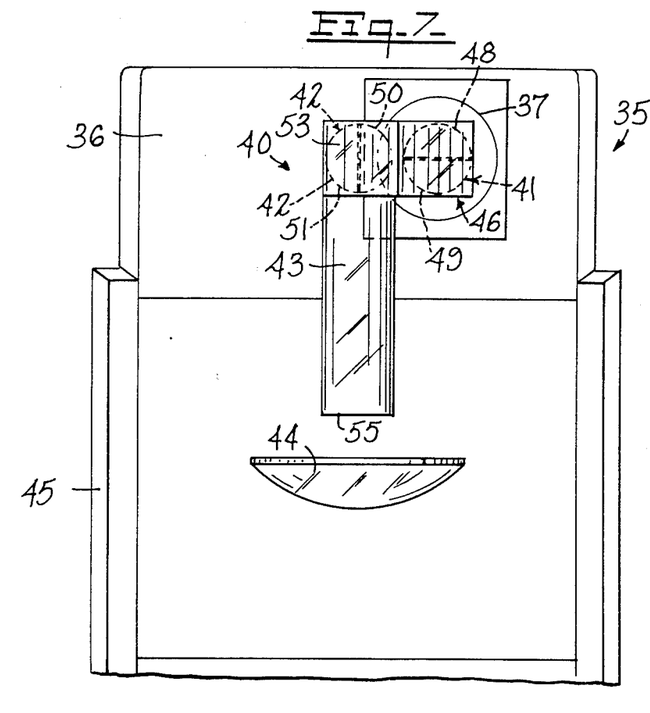
FIG. 7 is a view of the system of FIG. 6 seen from the left side thereof.

Here the light mixer comprises tubular lengths 41, 42 and 43 disposed between the light source and a condenser 44. The condenser, bellows and lens are omitted for simplicity of illustration. The lower section 43 depends from the upper housing 36 into condenser housing 45. The mixer 40 additionally comprises a prism or prisms 46, which is more clearly shown in FIGS. 7 and 8 and also a prism 47. The prism 46 comprises two right angle prisms or the equivalent thereof, and prism 47 is a right angle prism.

Figures 8, 9, 10:
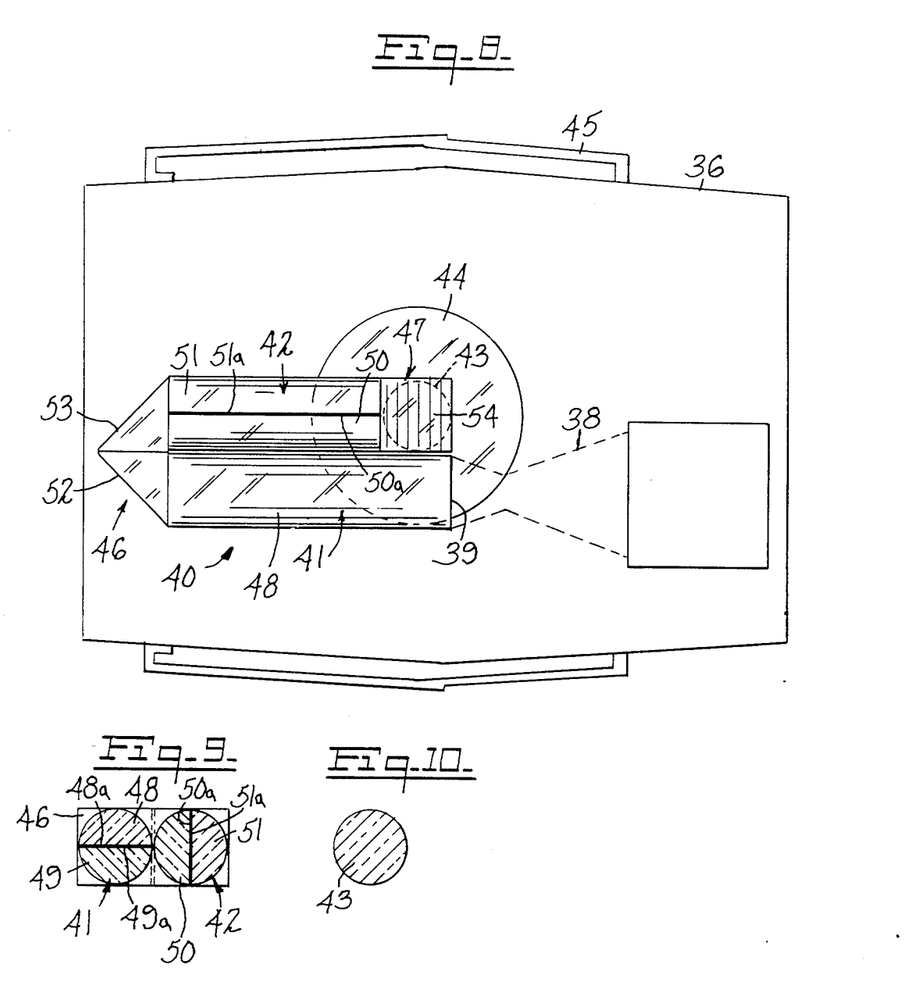
FIG. 8 is a top plan view of the system of FIGS. 6 and 7.
FIG. 9 is a view seen in the plane of lines 9—9 of FIG. 6.
FIG. 10 is a view seen in the plane of lines 10—10 of FIG. 6.

The length 41 comprises, as shown, two half-round sections 48 and 49 disposed as to have substantially parallel internal reflecting surfaces 48a and 49a (FIG. 9). The section 42 comprises half-round sections 50 and 51 with substantially parallel internal surfaces 50a and 51a. Light entering the entrance 39 of length 41 after reflection on surfaces 48a and 49a and the peripheral surfaces is reflected by surfaces 52 and 53 of prism 46 and transmitted through length 42 to length 43.

It will be noted that the surfaces 48a and 49a are substantially perpendicular to the surfaces 50a and 51a. The light reflected from surface 53 of prism 46 travels length 42 with almost total internal reflection to prism 47 and is reflected from surface 54 thereof into solid length 43 from whence it exits from end surface 55 to condenser 44.

The arrangement of FIGS. 6-10 is substantially the same as that of FIGS. 1-4 with the exception that the prisms 46 and 47 provide a folding of the longitudinal axis and hence decrease the vertical dimension of the mixer by over one-half. The apparatus of FIGS. 6-10, similar to the previous embodiment, has internal reflecting surfaces over half its optical length and may have three diffusing surfaces.

The device shown in FIGS. 6-10 may be formed with section 48, prism 46, section 50 and prism 47 integral as by molding, then separate sections 49, 51, and 43 are assembled thereto. The round and half-round members may be made on a ½ inch radius. The length of elements 48 and 49 is approximately 4½ inches, and the length of elements 50 and 51 less prism 47 is 3 inches. The length of section 43 is also three inches. This arrangement provides a color mixer of only four inches in the vertical direction, yet has a length of over ten inches plus the length of the travel of the light through the prisms. Each length meets the foregoing preference that the axial dimension is twice the diameter.

Preferably one surface of each section joined to the larger assembly is ground for purposes of diffusion as is the exit surface 55 of length 43, and the entrance surface of the integral section of length 41.

Figures 11, 12, 13:
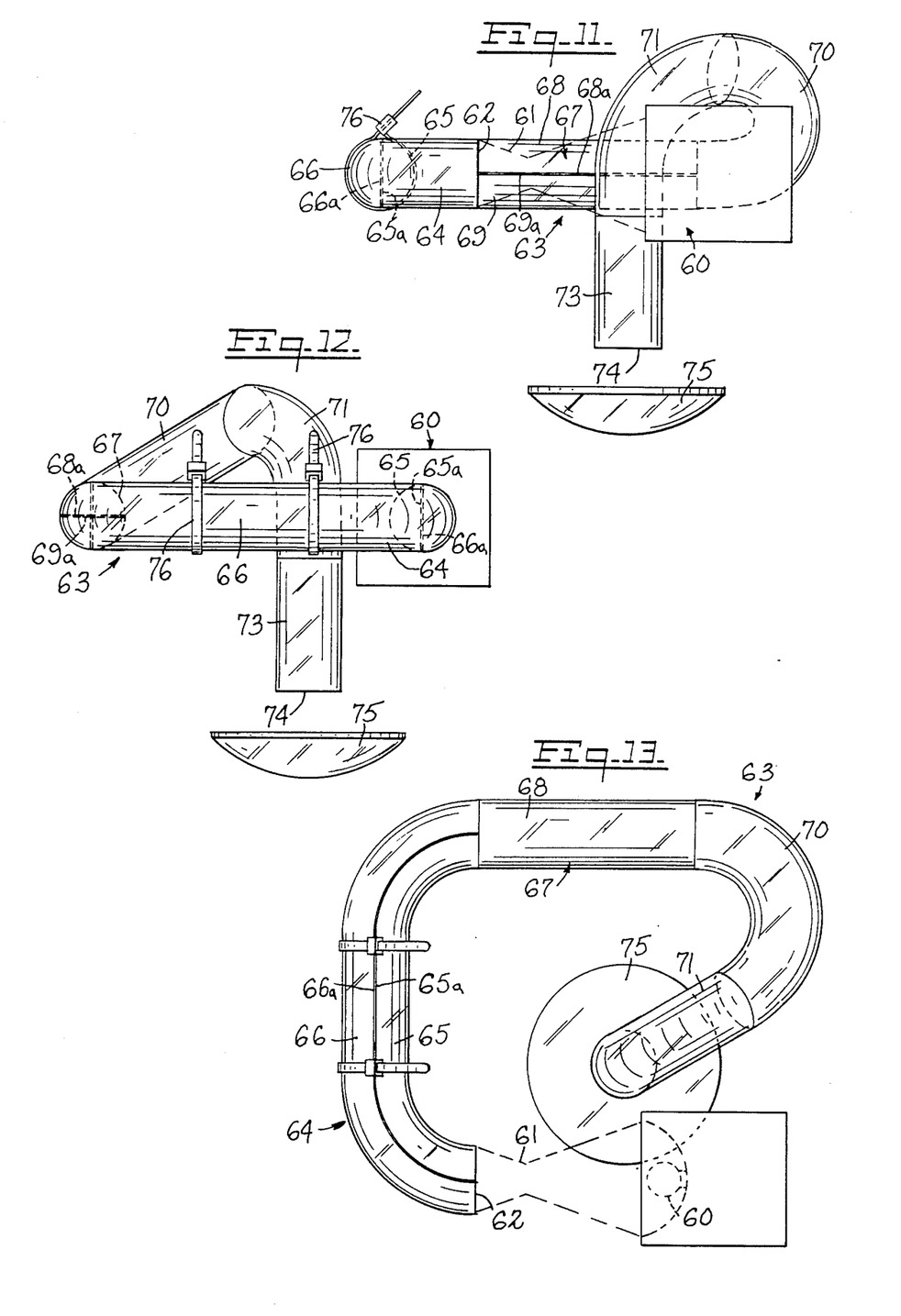
FIG. 11 is a side elevation of another embodiment of the invention.
FIG. 12 is a view of the system of FIG. 11 seen from the left side thereof.
FIG. 13 is a top plan view of FIG. 11.

A still further embodiment of the invention wherein a greater optical path can be achieved is shown in FIGS. 11-13. The mixing device here, as seen in plan view, comprises a light source 60 directing focused light as exemplified by the reference numeral 61 to the entrance surface 62 of a mixing device 63. A first length 64 comprises split sections 65 and 66 having essentially parallel internal reflecting surfaces 65a and 66a. Length 64 extends in a generally horizontal plane with the internal surfaces generally vertical. After length 64 is disposed a straight length 67 which as shown in FIG. 11 comprises two half sections 68 and 69 with internal reflecting facing surfaces 68a and 69a. Length 67 is followed by a solid length 70 which curves about a radius in both the vertical and horizontal approximately 147° as seen in the horizontal plane. Length 70 is succeeded by a length 71 of curved configuration having an input surface mated to the output surface of length 70 and an output surface in an essentially horizontal plane which coincides with the input to a vertical solid section 73. Exit surface 74 of length 73 directs the light into a condenser 75. The radii of lengths 70 and 71 are so chosen that the light reflecting at the peripheral surfaces, and also the internal surfaces is at an angle equal to or greater than the critical angle and, therefore, almost total internal reflection will occur. It has been found that where the tubing is solid (no internal surfaces) the radii of curvatures of the sections and lengths should be at least twice the cross-sectional diameter. For example, where the diameter of length 70 is one inch, the radius at the inside bend should be approximately two inches. This will vary with the index of refraction of the mixer which determines the critical angle.

The critical angle of light attempting to pass from one media to another is given by $$\sin Ic = (n^1/n)$$

where Ic is the critical angle; $n^1$ the index of refraction of the less dense medium; and $n$ is the index of refraction of the denser medium. Therefore, the radius of a bend will be determined not only by the diameter or other cross-sectional dimension of the tubing, but also the index of refraction of the mixer.

In the example shown in FIG. 11-13 the device has been constructed wherein the total diameter of both the solid sections and the split sections is 1 inch. Thus, the radii to all curved surfaces is twice the cross-sectional dimension of the rod measured on the radius.

In any event, where the sections are to be curved, the radius is so chosen that the critical angle is exceeded and there is no refraction of light outside of the tubing, only internal reflection of light along the tubing.

In an embodiment according to FIGS. 11-13 the dimension over the entrance and exit surfaces of section 64 between the internal surfaces was 5¼ inches, section 67 was 3¼ inches, section 74 was 2½ inches and the part 70 has a rise of no more than 2 inches, thus the overall vertical dimension of the mixer is approximately 5 inches or less, a compact size which would not substantially increase the size of an enlarger.

In this embodiment, the light entering surface 62 is reflected along the length of sections 65 and 66 into sections 68 and 69 with a plurality of internal reflections from the peripheral walls and the internal surfaces along the way. Thereafter, the light is again reflected along the lengths and at the radii of section 70 and section 71 to the output end 74. A plurality of the end surfaces of the elements may be made diffusing as desired. The internal surfaces are preferably polished to enhance reflection.

As shown in FIGS. 11-13, the split lengths may be held in position by the use of nylon straps 76 of the type commonly used to tie bundles of electrical wire or cable, such straps absorb little, if any, light energy. These straps have ratchet like teeth thereon which engage a stop in the buckle portion.

Figures 14, 15, 16, 17:
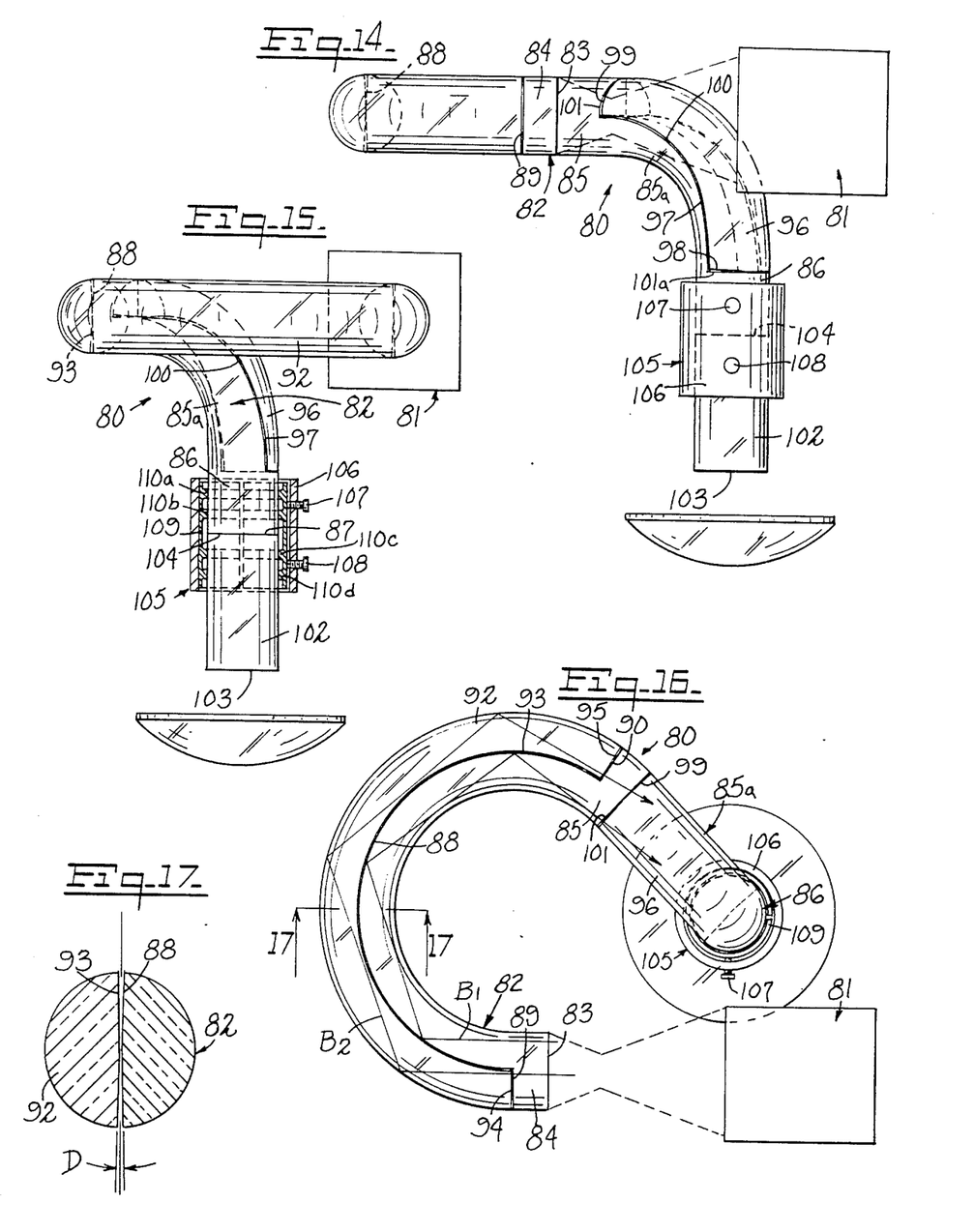
FIG. 14 is an elevation of another embodiment of the invention.
FIG. 15 is a view of the system of FIG. 14 seen from the left side thereof.
FIG. 16 is a plan view of the system of FIGS. 14 and 15.
FIG. 17 is a sectional view seen in the plane of lines 17—17 of FIG. 16.
Figure 18:
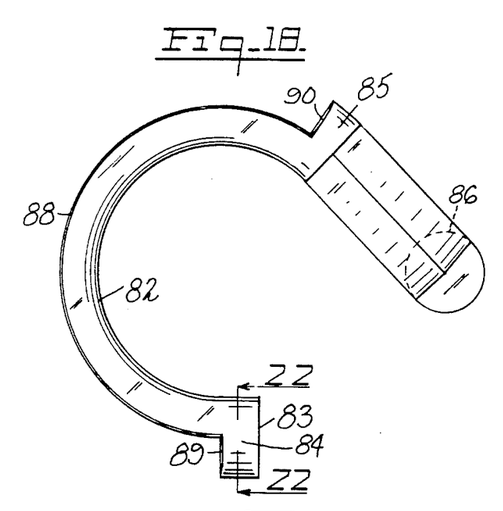
FIGS. 18–21 are views of components of the system of FIGS. 14–16.
Figure 19:
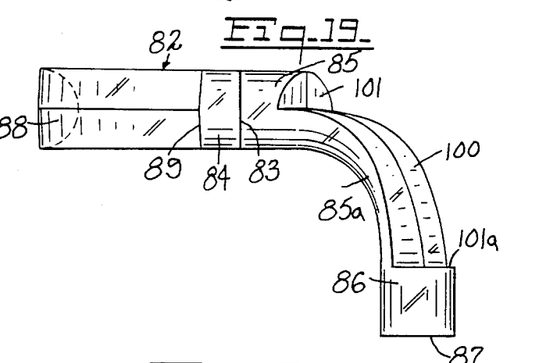
Figure 20:
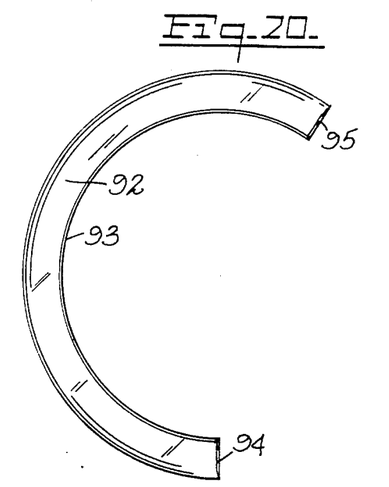

A further embodiment of the invention is shown in FIGS. 14-23 which has substantially the same length as the embodiment of FIGS. 11-13, yet only requires four sections of material. A mixer is shown assembled in FIGS. 14-17, and the elemental parts are shown in FIGS. 18-23. This mixing system 80 receives energy from a light source 81. Mixer 80 comprises a major section 82 (FIGS. 18 and 19), having an entrance surface 83. Section 82 includes an initial round portion 84 followed by an essentially half round section of over 180° curvature, a round portion 85, a downwardly curving essentially half round portion 85a, and terminating in a round portion 86, having an end surface 87. Surface 88 of portion 82 is an internal reflecting surface and extends between end surfaces 89 and 90. Surfaces 88, 89 and 90 define a recess adapted to receive a section 92 (FIG. 20), having a generally flat inner reflecting surface 93, an outer surface formed on the same radii as the inner peripheral surface of section 82, and end surfaces 94 and 95. When assembled, the sections 82 and 92 provide two internal reflecting surfaces 88 and 93. As shown in FIG. 17, the surfaces 88 and 93 are defined with a slight draft D of about 1°, for molding purposes.

Another section 96 (FIG. 21) is formed complementary to section 85, and has an internal reflecting surface 97 and end surfaces 98 and 99. Section 96 is received in the recess of portion 85a defined by internal reflecting surface 100 and end surfaces 101 and 101a. The internal reflecting surfaces 88 and 93 are radially arcuate in a plane which is essentially perpendicular to a plane in which the surfaces 97 and 99 are radially arcuate. Otherwise stated, the second internal reflecting surfaces are rotated 90° with respect to the first reflecting surfaces. The sections 92 and 96 may be assembled to section 82 by means of straps 76, previously described. Another length 102 of round section having end surfaces 103 and 104 is joined to portion 86 by a coupling member 105.

Figure 21:
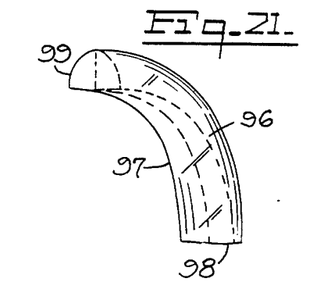
Figure 22:
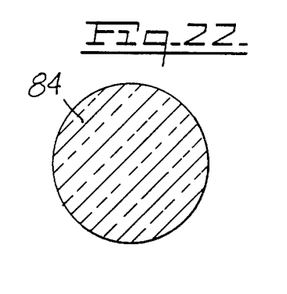
FIG. 22 is a view seen in the plane of lines 22—22 of FIG. 18.

Coupling member 105 comprises an outer sleeve member 106 having set screws 107 and 108 threadable therethrough into contact with a split sleeve 109. Split sleeve 109 has internal ridges or sleeves 110a–110d which compressively hold portion 86 and length 102 in end-to-end position. As screws 107 and 108 are tightened, the split sleeve is compressed and shoulders 110a–110d engage and hold length 102 to section 82.

Light entering the mixer at surface 83 is reflected from the half-round outer walls of sections 82 and 92 back into the mixer and also the internal surfaces as shown by rays $B_1$ and $B_2$. Some rays will also be reflected back and forth between the internal and the peripheral walls of each section. By making the internal reflecting surfaces on radii, the curvature of the mixer may be decreased. If ray $B_1$ continued into section 92, it would strike the peripheral wall at an angle less than the critical angle, and be refracted through the periphery of section 92.

The light rays after several reflections, and resultant random mixing, enter length 85 and are reflected downwardly with additional mixing through length 102 and are directed to the condenser.

In the last described embodiment of the invention, the internal reflecting surfaces may be defined on a radius of one and one-half inches while the sectional radius is ½ inch. The split defining the internal reflecting surfaces thus permits the inner radius to be made less than twice the diameter of the mixing tube. A mixer as shown is preferably molded or cast in a polished mold, and the individual ports then assembled as described. Selected end surfaces may be ground or otherwise treated to provide diffusing surfaces. In the embodiment of FIGS. 14–16 surface 87 is preferably made a diffusing surface. This assembly also comprises two split lengths with internal reflecting surfaces and one solid length.

Figure 23:
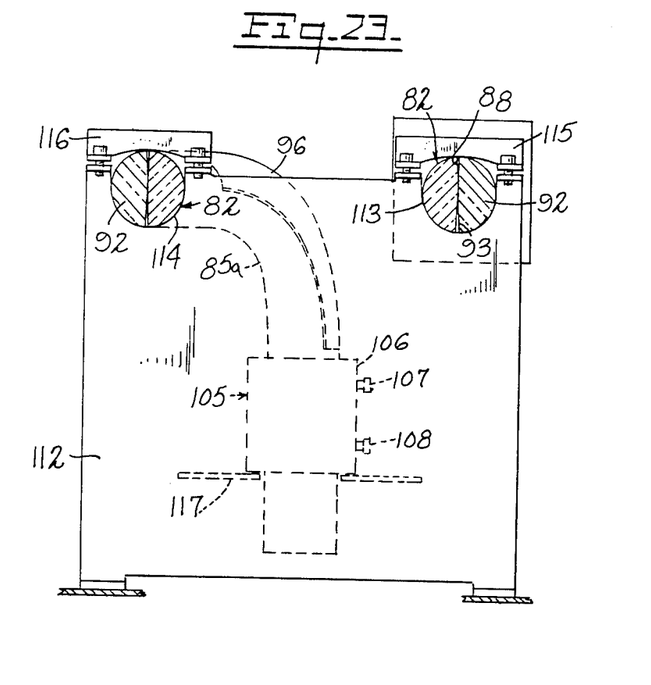
FIG. 23 is a view in elevation of a support for the mixer of FIGS. 14–16.

A mixer as shown in FIGS. 14–16 may be supported as shown in FIG. 23. An upright member 112 has spaced apart arcuate recesses 113 and 114, which seat sections 82 and 92 therein. Clamping members 115 and 116 engage the upper portion of sections 82 and 92. The area of contact of the edges of recesses 113 and 114, and clamps 115 and 116 is very small. A third point of support may be provided in the horizontal plane by a flange 117 extending from member 112 and engaging connection member 105.

From the theoretical standpoint, it would be preferable to have the internal reflecting surfaces slightly spaced apart, however, contact between internal reflecting surfaces will not cause passage of any appreciable light between half sections since the surface finish will be less fine than a few wavelengths of light, and full surface contact cannot be practically achieved. If the mating reflective surfaces are cemented and separated thereby, the index of refraction of the cement must be such that light is reflected from the internal surfaces and no appreciable light energy is lost as heat in the cement.

The end surfaces are preferably in contact, but this is not a necessity. The number of diffusing end surfaces will be selected in accordance with the overall length of the mixing tube. The diffusing surfaces aid in shortening the overall length. The dimension of each length of the mixer should be two or more times the diameter or major cross-sectional dimension in order to achieve a sufficient number of reflections of the light rays. While a mixer of round cross section (or two mating half rounds) is preferred and has been disclosed, the cross-section of the mixer may take other forms so long as there is no substantial light refracted from the mixer.

Whether the mixer is plastic or glass, it should be of optically clear quality. "Optically clear" refers to the ability of the medium to transmit light energy without loss, in the direction of the rays, or the medium has such minimal loss that there is no noticeable decrease in image contrast, or does not significantly affect the energy distribution.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A light mixing device for a photographic enlarger comprising an elongated solid rod-like member of optically clear material of substantially uniform diameter having entrance and exit ends and adapted to mix light entering the entrance end to substantially uniform intensity and color distribution at the exit end, at least a portion of the length of said member providing internal substantially parallel surfaces extending along the length thereof for reflection of light therefrom generally in the direction of the length of said member whereby light entering said member at said entrance end is mixed by internal reflections from said peripheral walls and said internal surfaces and the mixed light exits said exit end.

2. The mixing device of claim 1 where said rod-like member is formed in successive lengths and an end surface of one of said lengths intermediate the entrance and exit ends is a diffusing surface.

3. The mixing device of claim 1 wherein said rod-like member is formed in three successive lengths, two of said lengths provide internal reflecting surfaces, the internal reflecting surfaces of said lengths being substantially perpendicular to each other.

4. The mixing device of claim 1 where said rod-like member comprises at least two lengths, and a light diffusing means between said at least two lengths.

5. The mixing device of claim 1 wherein the light path through said lengths is folded by prisms.

6. The mixing device of claim 1 wherein the entrance end surface is light diffusing.

7. The mixing device of claim 1 wherein the exit end surface is light diffusing.

8. The mixing device of claim 1 wherein said rod-like member is substantially serpentine in configuration along its length.

9. The mixing device of claim 8 wherein said device comprises a first section having a generally round cross-section with a substantially half round section of its length removed, and a separate length of substantially half round section matingly fitted to said first section whereby said internal reflecting surfaces are defined on adjacent surfaces of said first and second sections.

10. The mixing device of claim 8 wherein the mixer curves in a substantially horizontal plane at least about 180° and then curves downwardly in a substantially vertical plane.

11. A light mixing device comprising a solid elongated generally tubular member of optically clear material having light entrance and exit ends, said member being of substantially constant diameter throughout its length and having peripheral walls, said member having at least one elongated partially sectional recess defined therein by first end surfaces and an internal surface, a section of optically clear material fitted to said tubular member in said recess, said section having second end surfaces, an internal surface and a peripheral surface complementary to said tubular member and essentially filling said recess whereby light introduced into said entrance end is reflected by said internal surfaces and said peripheral walls and mixed thereby prior to said exit end.

12. The mixing device of claim 11 wherein said elongated member has a second recess defined in the length thereof and a second section of solid optically clear material fitted to said rod-like member in said recess.

13. The mixing device of claim 11 wherein at least one end surface of said section is light diffusing.

14. The mixing device of claim 11 wherein at least one of said entrance and exit surfaces is light diffusing.

15. The mixing device of claim 11 wherein said light entrance and exit surfaces reside in planes which are transverse to each other.

16. The mixing device of claim 15 where said planes are substantially perpendicular.

17. A photographic enlarger comprising, a light source, a light mixing device, and color filters arranged to be moved between the source and the mixing device, said mixing device comprising a solid elongated rod-like member of an optically clear material of essentially constant diameter along its length and having peripheral walls, a longitudinal axis, an entrance end and an exit end, said member having internal essentially parallel surfaces extending along the length thereof for reflection of light therefrom, said light source adapted to direct light toward said entrance end so that the light passes generally axially through said member with internal reflections from said peripheral walls and said internal surfaces along the length of said member whereby light from said source entering said entrance end after passing through one or more of said filters is mixed in said rod-like member, the mixed light exiting said member through said exit end, said internal surfaces residing in planes essentially perpendicular to the axis of said rod-like member.

18. An enlarger as defined in claim 17 wherein both said entrance end and said exit end are diffusing.

19. An enlarger as defined in claim 20 wherein said entrance end is light diffusing.

20. An enlarger as defined in claim 17 further comprising means between said light source and said entrance end for diffusing light from said light source.

21. An enlarger as defined in claim 17 further comprising means defining a light entrance pupil between said light source and said entrance end.

* * * * *